March 19, 1929. T. ZWEIGBERGK 1,706,276
ELECTRIC TRANSMISSION SYSTEM
Filed Feb. 5, 1927
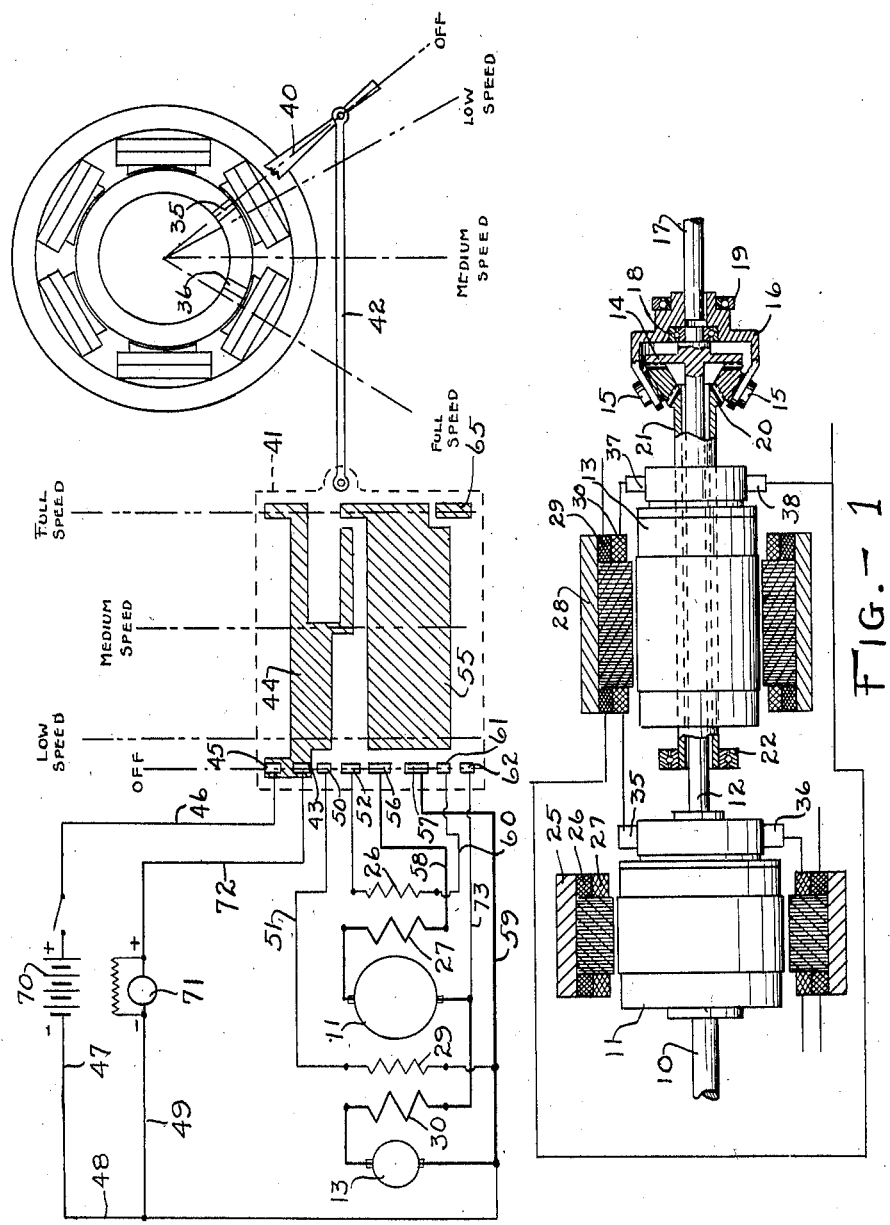

Patented Mar. 19, 1929.

1,706,276

UNITED STATES PATENT OFFICE.

THORSTEN ZWEIGBERGK, OF LONDON, ENGLAND.

ELECTRIC TRANSMISSION SYSTEM.

Application filed February 5, 1927, Serial No. 166,076, and in Great Britain December 21, 1926.

This invention relates to electro-magnetic transmissions and is more particularly concerned with improvements in a transmission which is illustrated in Letters Patent of the United States No. 1,292,218 issued to me January 21, 1919. Such transmission embodies two armatures which have a common series wound field. When the transmission is used in a motor vehicle, then one of the armatures is connected to the engine shaft while the other is connected through an epicyclic gearing to the propeller shaft while independent sets of shiftable brushes are associated with the respective armatures and are operable to effect variations in the torque and speed relationship between the two shafts.

I have found in practice however, that by using series wound dynamos in his relationship, an objectionable hunting or surging develops in the main circuit. This is especially noticeable on the lower speeds when the armature connected to the epicyclic gearing is used as a generator. At high speed, that is, when the armature connected to the engine acts as a generator with its full voltage, the hunting or surging is not so objectionable, but nevertheless, it is sufficient to be unsatisfactory. If the dynamos are provided with self-excited shunt windings, the effect is still noticeable except on high speed.

An object of the present invention therefore, is to provide means for eliminating the objectionable hunting or surging at all speeds while still obtaining the advantages of a series wound machine. Still another object is to simplify the control mechanism so as to permit satisfactory operation of the transmission by the use of a single operating member.

I accomplish these objects by using shunt windings, in addition to the series wound fields, and by separately exciting the shunt windings from a substantially constant voltage source of supply. I have found that with this arrangement I can obtain stabilization at all speeds, and that the independent circuit may be cut out at high speed. Thus, an ordinary car lighting set can be effectively used for exciting the shunt windings but, if desired, the battery can also be used in the same manner. However, by making the operation of the transmission independent of the battery, I obtain greater reliability and permit the use of a smaller battery.

In the drawings, Fig. 1 is a vertical section taken longitudinally through an electromagnetic transmission embodying my invention with part of the mechanism shown in elevation; Fig. 2 is a wiring diagram showing the relationship of the circuits to the mechanically actuated controller.

In Fig. 1 the electro-magnetic transmission is illustrated apart from a motor vehicle and as comprising two armatures 11 and 13 which provide an operative connection between a driving shaft 10, and a driven shaft 17. The shaft 10 comprises a continuation of an engine shaft which is suitably connected to the armature 11, which in turn is connected to shaft 12. The shaft 12 is shown as extending through armature 13, and as being connected to gear 14 which forms the sun wheel of a sun and planetary gear connection. Planetary gears 15 which mesh with the gear 14 are journalled within a casing 16 which is rigidly connected to propeller shaft 17. As shown, the casing is supported by one bearing 18 upon the shaft 12, and by another bearing 19 associated with a stationary support (not shown). The planetary gears 15 also engage a sun wheel in the form of a pinion 20 which is rigidly mounted upon the end of a sleeve 21. This sleeve is rigidly connected with the armature 13 and is shown as being supported at the end opposite the pinion by a bearing 22, which may also be carried by a stationary support (not shown).

A stationary field 25, with field coils 26 and 27 surrounds armature 11, while another stationary field 28 with field coils 29 and 30 surrounds armature 13. The coils 27 and 30 are series wound, while the coils 26 and 29 are shunt wound, and are adapted to be connected in circuit in a predetermined manner by operation of a manually actuated controller, as will be hereinafter set forth. Moreover, the windings of the two machines are such that the electric strength of one machine is about equal to that of the other.

The armature 11, is shown as having brushes 35 and 36 associated therewith, while the armature 13 as illustrated, has brushes 37 and 38 associated therewith. By maintaining the brushes on the armature 13 stationary, and by shifting only the brushes on the armature 11, I can regulate the torque and speed of the propeller shaft with relation to that of the engine shaft. In Fig. 2 the brushes 35 and 36 are shown in the "off" position, while a hand lever 40 is arranged to shift the brushes simultaneously. A control drum 41 may be operatively connected by a link 42 to the lever, so as to control the circuit connections simultaneously with the shifting of the brushes, I have shown such control drum diagrammatically with sufficient arrangement of contacts to vary the connections of the circuits at the proper time.

Since the electrical strength of the two machines, as heretofore set forth, is about equal, then if the propeller shaft is stationary, while the engine is running, the gearing is so arranged that the sleeve 21, and therefore the armature 13, makes twice as many revolutions in a reverse direction, as the shaft 12, and the armature 11, makes in a forward direction. Consequently, the counter-electromagnetic force of armature 13 is about twice that of the armature 11. My patent, heretofore referred to, sets forth in detail the manner of winding the armature and field coils to maintain substantially the same electrical strength.

To insure stability of the generated current I provide shunt wound fields, which in Fig. 2 are illustrated conventionally, in addition to the series wound fields. Moreover, I have illustrated two sources of constant voltage supply, one a battery 70, and the other a car lighting-generator set 71, which may be driven by the engine in the usual way. These sources of supply are adapted to be selectively connected in circuit by the contactor drum 41, which is actuated whenever the lever 40 is moved from one position to another.

In the position shown in Fig. 2, the lever 40 is in the "off" position at which point the brushes 35 and 36 are on one side of the pole centers. In this position, assuming that the engine is running, current flows from the source of supply 71 through line 72 to contact 43, thence through the contact plate 44, to contactor 45, line 46 to charge the battery 70 and thence through lines 47, 48 and 49 back to the source of supply. In this position, the armatures run idly and generate no current. Assuming now that the lever is shifted to the low speed position, then the brushes are moved opposite the pole centers. Similarly, the controller is moved to the low speed position where current flows from the source of supply 71, through line 72, contact 43, plate 44, contact 50, line 51, shunt winding 29, and thence back to the source of supply. As soon as the plate 44 closes contacts 43 and 50, plate 55 closes contacts 56 and 57. This closes the main circuit through the generators, and as armature 13 is rotating at a higher speed than armature 11, it generates a current, which flows through line 59, contact 57, plate 55, contact 56, through line 58, field 27, armature 11. field 30 and armature 13. Since the shunt winding 29 is energized at the same time, then the current generated by armature 13 is stabilized.

At low speed the armature 13 reacts on the gearing which connects it to the propeller shaft, and the current which this reaction generates drives armature 11 in the same direction as the engine shaft and thereby adds torque to the engine. At this point therefore, maximum torque is obtained, since the total torque is the sum of that developed by the two generators, and by the engine. As the speed of the propeller shaft increases the maximum torque is not required, hence the brushes 35 and 36 may be moved forwardly to medium speed position.

At the medium speed position, the brushes are between the poles. Thus, effective conductors in the armature 11 are gradually cut out and the torque decreases, but the speed of the propeller shaft, and hence the speed of the car increases. When the armature 11 is completely cut out, the armature 13 is nearly at a standstill, as it is practically short circuited. In the meantime the speed of the car is increasing, and during this period the field 29 has been energized by the source of power 71. A further slight shifting of the brushes in a forward direction at the medium-speed position has the effect of making armature 11 a generator and armature 13 a motor. This occurs when the plate 44 engages contact 52 and energizes shunt field winding 26, from whence current flows through line 60 to contact 61, which is connected to the negative side. At approximately the same angle of brush movement, contact 50 is broken and armature 13, as heretofore stated, becomes a plain series motor.

The stabilizing effect of the shunt winding 26 is maintained during further travel of the brushes in a forward direction until the full speed is obtained. At the full speed position the source of power 71 is cut out, and the shunt field 26 is directly charged by the armature 11 through contact plate 55 which engages contact 52. In this position, current flows from armature 11, through field 27, line 58, contact 56, to plate 55. At the plate the current divides, and flows partly through contact 52, field 26, line 60, contact 61, plate 65, contact 62, and line 73 to the negative side of the generator. The rest of the current flows from plate 55 to contact 57, line 59, armature 13, field 30 and operates the armature 13 as a motor. At the same time the source of power 71 is again connected to the battery for charging purposes through the plate 44, which engages contact 45 at full speed position.

By the arrangement just described, I have used a constant source of voltage supply, such as the ordinary car lighting equipment for a motor vehicle, but it is obvious that the battery can be directly connected as a stabilizer if so desired. By using the car lighting set as an independent source of constant voltage supply, I make the operation of the transmission independent of the battery and also permit the use of a smaller battery.

My invention is advantageous in that the generated current is stabilized to such an extent that all objectionable hunting or surging is eliminated during the transition stages of operation. The improved construction can be readily incorporated in an electro-magnetic transmission which embodies the principles set forth in my patent, heretofore referred to. In addition, the use of the shunt wound fields combined with the series wound fields, permits the various rates of speeds and torque between the engine and propeller shafts to be effectively obtained by the shifting of only one set of brushes. This tends to simplify the construction.

I claim:

1. In combination, a driving member, a driven member, an electro-magnetic transmission mechanism connecting the two, comprising a primary dynamo having its armature connected to the driving member, and a secondary dynamo having its armature connected by epicyclic gearing with both the driving and driven members, said primary dynamo being series wound and having also a shunt winding, a separate generator, and a controller coupled with means for shifting the brushes of the primary dynamo, and arranged, as the brushes move toward full speed position, to couple the separate generator with the shunt of the primary dynamo and finally to disconnect the separate generator from the primary shunt and connect said primary shunt about the primary armature for self-excitation.

2. In combination, a driving member, a driven member, an electro-magnetic transmission mechanism connecting the two, comprising a primary dynamo having its armature connected to the driving member, and a secondary dynamo having its armature connected by epicyclic gearing with both the driving and driven members, each dynamo being series wound and having also a shunt winding, a car-lighting generator, and a controller coupled with means for shifting the brushes of the primary dynamo and arranged, as the brushes move from off to full speed position, to couple the car lighting generator with the shunt of the secondary dynamo and thereafter to couple said car lighting generator with the shunt of the primary dynamo and cut out the shunt of the secondary dynamo and finally to disconnect the car lighting generator from the primary shunt and connect it with the battery, and connect said primary shunt about the primary armature for self-excitation.

3. An electro-magnetic transmission mechanism having primary and secondary armatures in a suitable field, one armature connected with the driver and the other connected by epicyclic gearing with the driven member, characterized by there being a separately excited shunt circuit for the field to effect stabilization during generation.

4. An electro-magnetic transmission mechanism having a pair of dynamos, one with its rotor connected with the driver and the other with its rotor connected by epicyclic gearing with both the driver and the driven member characterized in that there is a separate circuit having a separate excitation to stabilize one of the dynamos.

5. An electro-magnetic transmission mechanism as claimed in claim 4, wherein the separate circuit is automatically cut in and thereafter automatically cut out as the controller moves from off position to full speed position.

6. The system claimed in claim 4 characterized by the separate circuit being a lighting circuit which is cut off at full speed and connected to the battery.

7. An electro-magnetic transmission as claimed in claim 4, in which the stabilization at full speed is done by the dynamo connected to the driver which at that time is self-excited.

8. An electromagnetic transmission mechanism having a pair of dynamos, one with its rotor connected with the driver and the other with its rotor connected by epicylic gearing with both the driver and the driven member, characterized in that there is a separate circuit with individual source of power to stabilize one of the dynamos during the acceleration period, said separate circuit being connected for extraneous use on the "off" and "full speed" positions.

9. An electromagnetic transmission mechanism having a pair of dynamos, one with its rotor connected with the driver and the other with its rotor connected by epicyclic gearing, with both the driver and the driven member, characterized in that there is a separate circuit containing a car lighting generator and means adapted to connect the car lighting generator for ordinary purposes on the "off" position and the "full speed" position but on the accelerating positions to connect the car lighting generator to stabilize one of the dynamos.

10. In combination, a driving member, a driven member, an electro-magnetic transmission comprising primary and secondary dynamo-electric machines, one connected with one of said members and the other connected by gearing with both of said members, means for controlling the operation of the transmission to vary the speed relation of the driving and driven members, and separately excited electric means for effecting electrical stabilization of the transmission during the period of speed change.

11. In combination, a driving member, a driven member, an electro-magnetic transmission comprising primary and secondary dynamo-electric machines, one connected with one of said members and the other connected by gearing with both of said members, said transmission including an electrical circuit and a pair of brushes, means for shifting the brushes to control the flow of current in said circuit, and separately excited electric means operable upon shifting of the brushes for acting on said circuit to effect stabilization thereof.

12. In combination, a driving member, a driven member, a pair of armatures interposed between the members and providing an operative connection therebetween, one of said armatures being connected with one of said members and the other armature connected by gearing with both of said members, brushes and a field associated with each of said armatures, electrical circuits through the armatures and fields, brush shifting means for controlling the flow of current in said circuits, and mechanism connected with said brush shifting means and cooperating with said fields to independently excite them for effecting stabilization of current in said circuit.

13. In combination, a driving and driven member, an electro-magnetic transmission comprising primary and secondary dynamo-electric machines, one connected with one of said members and the other connected by gearing with both of said members, said transmission having an electric circuit including a pair of brushes therein, means for shifting said brushes to control the flow of current in said circuit and thereby to effect speed variations between said members, a second electrical circuit and separately excited electric means in said last named circuit for effecting stabilization of current in the first circuit during the transition period of speed relationship between said members.

14. In combination, a driving and driven member, an electro-magnetic transmission comprising primary and secondary dynamo-electric machines one connected with one of said members and the other connected by gearing with both of said members, an electric circuit for said transmission, said circuit including a series wound field, means acting upon said circuit for controlling the speed relationship of said members, and separate means including a shunt wound field and means for independently energizing such field for effecting stabilization of the current.

15. In combination, a driving and driven member, an electro-magnetic transmission comprising primary and secondary-dynamo-electric machines, one connected with one of said members and the other connected by gearing with both of said members, an electric circuit for said transmission, said circuit including a series wound field, means acting upon said circuit for controlling the speed relationship of said members, separate means including a shunt wound independently excited field acting upon said circuit for effecting stabilization of the same, said last named means being adapted to be inactive at a predetermined speed relation between said members.

16. In combination, a driving and driven member, an electro-magnetic transmission comprising primary and secondary dynamo-electric machines, one connected with one of said members and the other connected by gearing with both of said members, said transmission including an electric circuit and a pair of shiftable brushes, said brushes being so arranged that shifting of the same controls the flow of current in said circuit and thereby controls the speed relationship between said members, said brushes having certain predetermined positions corresponding to low, intermediate, and high speeds, a second electrical circuit and separately excited electric means in said last named circuit for effecting stabilization of the first mentioned circuit, said last named means being arranged to be active during some of said speed positions and inactive during other speed positions.

17. In combination, a driving and driven member, an electro-magnetic transmission, comprising primary and secondary dynamo-electric machines, one connected with one of said members and the other connected by gearing with both of said members, an electric circuit for said transmission, means in said circuit for controlling the flow of current in the same, and thereby to control the speed relationship between said members, said means having certain predetermined positions corresponding to low, intermediate, and high speed, and separately excited electric means acting upon said circuit to effect stabilization of the same, said last named means being active upon low, and intermediate speed positions, and being inactive upon high speed position.

18. In combination, a driving and driven member, an electro-magnetic transmission comprising primary and secondary dynamo-electric machines, one connected with one of said members and the other connected by gearing with both of said members, an electric circuit for said transmission, said circuit including a series wound field and a pair of shiftable brushes, an independent electrical circuit including a shunt wound field, and means actuated automatically upon shifting of the brushes for separately energizing said shunt winding during one predetermined speed relationship between the members, and for deenergizing the shunt winding upon another predetermined speed relationship between said members.

19. In combination, a driving and driven member, an electro-magnetic transmission comprising primary and secondary dynamo-electric machines, one connected with one of said members and the other connected by gearing with both of said members, an electric circuit for said transmission, said circuit including a pair of shiftable brushes, an independent electrical circuit, separately excited means in the independent circuit for stabilizing the flow of current in the first named circuit, and a circuit controller operatively connected to the brushes for actuating said last named means simultaneously upon shifting of the brushes, said controller being so arranged that said last named means is rendered active only upon certain predetermined speed relationship between said members.

20. In combination, a driving and driven member, an electro-magnetic transmission comprising primary and secondary dynamo-electric machines, one connected with one of said members and the other connected by gearing with both of said members, said transmission including a pair of armatures, a series wound field associated with each armature, a pair of shiftable brushes associated with one of the armatures, an electric circuit including said fields and brushes, a separately excited independent electric circuit including shunt field windings, and a circuit controller arranged to be actuated upon shifting of said brushes to energize the shunt field windings and thereby effect stabilization of current in the first named circuit during the transition period of speed relationship between said members, said controller being arranged to deenergize the shunt field windings when the brushes have been shifted to a predetermined position.

21. The combination with a driving and a driven member and an electromagnetic mechanism connecting them including a pair of dynamos, one of said dynamos being connected with one of said members and the other dynamo connected by gearing with both of said members, characterized in that there is a separate circuit including a car lighting generator and means to connect said circuit to stabilize one of the dynamos during the acceleration period only.

22. The combination with a driving and a driven member and an electromagnetic mechanism connecting them including a pair of dynamos, one of said dynamos being connected with one of said members and the other dynamo connected by gearing with both of said members, characterized in that there is a separate circuit containing a car lighting generator and a battery, and a controller adapted to close the car lighting generator on the battery on the "off" position and the "full speed" position but on the accelerating positions to leave the battery line open and connect the car lighting generator to stabilize one of the dynamos.

In testimony whereof, I hereunto affix my signature.

THORSTEN ZWEIGBERGK.